United States Patent

[11] 3,542,169

[72] Inventor  Johannes Ortheil
              10 Allee, Anrath 4151, Germany
[21] Appl. No. 769,114
[22] Filed     Oct. 21, 1968
[45] Patented  Nov. 24, 1970
[32] Priority  Oct. 25, 1967
[33]           Germany
[31]           1,625,390

[54] DAMPING MEANS FOR HYDRO-PNEUMATIC OLEO STRUTS AND THE LIKE
     5 Claims, 3 Drawing Figs.
[52] U.S. Cl. .................................................. 188/285,
                                                              188/100
[51] Int. Cl. ................................................. F16f 9/32
[50] Field of Search ............................... 188/88.502,
                            .505, .509, BB, BA, 96.2, .51, .9, 100P

[56]                    References Cited
                   UNITED STATES PATENTS
  461,347  10/1891  Krone ........................... 188/96.9UX
2,332,520  10/1943  Lucht ........................... 188/96.9UX
2,575,389  11/1951  Lornitzo ....................... 188/88BAUX
3,111,201  11/1963  Bliven et al. ................. 188/88(.509)
3,215,426  11/1965  Engels .......................... 188/96.(9)X
3,445,103   5/1969  Hennells ........................ 188/96.(9)X
                    FOREIGN PATENTS
1,076,192   4/1954  France ........................... 188/100(R)

Primary Examiner—George E. A. Halvosa
Attorney—Holman, Glascock, Downing & Seebold ABSTRACT: A line of movement dependent damping means for hydropneumatic oleo struts or the like in which a cylinder has a piston therein and a pressure reservoir or accumulator is operably connected with the pressure space of the cylinder having a damping characteristic variable as a function of the position of the piston relative to the cylinder.

INVENTOR
JOHANNES ORTHEIL

DAMPING MEANS FOR HYDRO-PNEUMATIC OLEO STRUTS AND THE LIKE

BACKGROUND OF INVENTION

This invention relates to a line of movement dependent damping assembly for hydropneumatic oleo struts and the like.

Such damping assemblies are used, for example, for the so-called end position dampings of cylinders and in such assemblies the piston is provided with an axially directed shoulder which moves in a corresponding bore in the cylinder and displaces the liquid present through the remaining annular space which becomes longer with an increasing piston stroke. The disadvantage of this particular arrangement is that the damping characteristic cannot be changed and moreover, the length of the cylinder increases by the length of damping.

Another damping assembly of the aforementioned type is disclosed in German Pat. No. 1,058,854 in which the wall of the cylinder provides a succession of axially spaced bores of decreasing diameter and as the piston moves over the bores, the remaining cross section for flow becomes increasingly smaller and the damping accordingly more difficult. With this particular arrangement a variation of the damping characteristic is not possible which of course is undesirable. In addition, the hardness of the damping does not increase in a continuous manner but in a stepwise manner and due to the conduits for intercepting and transferring the liquid passing through the bores the structural dimensions of the assembly are increased.

SUMMARY OF INVENTION

It is salient of the present invention to provide a strictly line of movement proportional damping assembly which permits adjustment and which assembly by being compact can be accomodated within the dimensions of a common or customary cylinder unit.

The foregoing object is realized by providing between the pressure space of the cylinder and a pressure reservoir or accumulator, a spring loaded pressure limiting or pressure gradient valve which opens towards the reservoir, with the tension of the spring being variable by a displacement of a spring abutment corresponding to the relative movement between the piston and cylinder.

In a preferred embodiment of the invention, the pressure limiting valve is disposed within the cylinder and is constituted by a rod which extends axially into the pressure space and which constitutes together with a piston slidable in a hollow piston rod and biased by a spring against the piston rod, a valve seat and the pressure reservoir or accumulator is operably connected with the spring zone or area.

The rod may be hollow and functions as means for providing communication with the reservoir and a free flow from the reservoir to the pressure space can be effected by a check valve arranged in parallelism with the pressure gradient valve but opening in the opposite direction.

Further objects and advantages of the invention will become more readily apparent to persons skilled in the art from the following detailed description and annexed drawings.

DETAILED DESCRIPTION OF INVENTION

Figure 1:
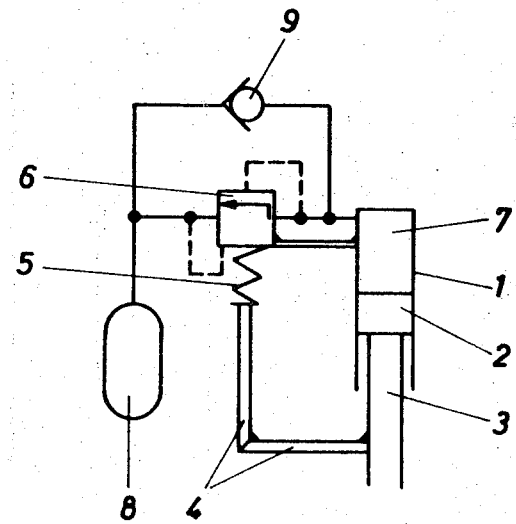
FIG. 1 is a diagrammatic view illustrating the salient aspects of the invention.

Referring to FIG. 1, it will be noted that the assemblage includes a cylinder 1 in which a piston 2 is slidably mounted and is provided with a piston rod 3. The piston rod 3 by means of a control means 4 varies the initial tension of a spring 5 of a pressure gradient valve 6 which is connected to pressure space 7 of the cylinder 1. The pressure space 7 via the valve 6 is connected with a pressure reservoir or accumulator 8. A check valve 9 which opens in the opposite direction may be connected in parallel with the pressure valve 6.

Figure 3:
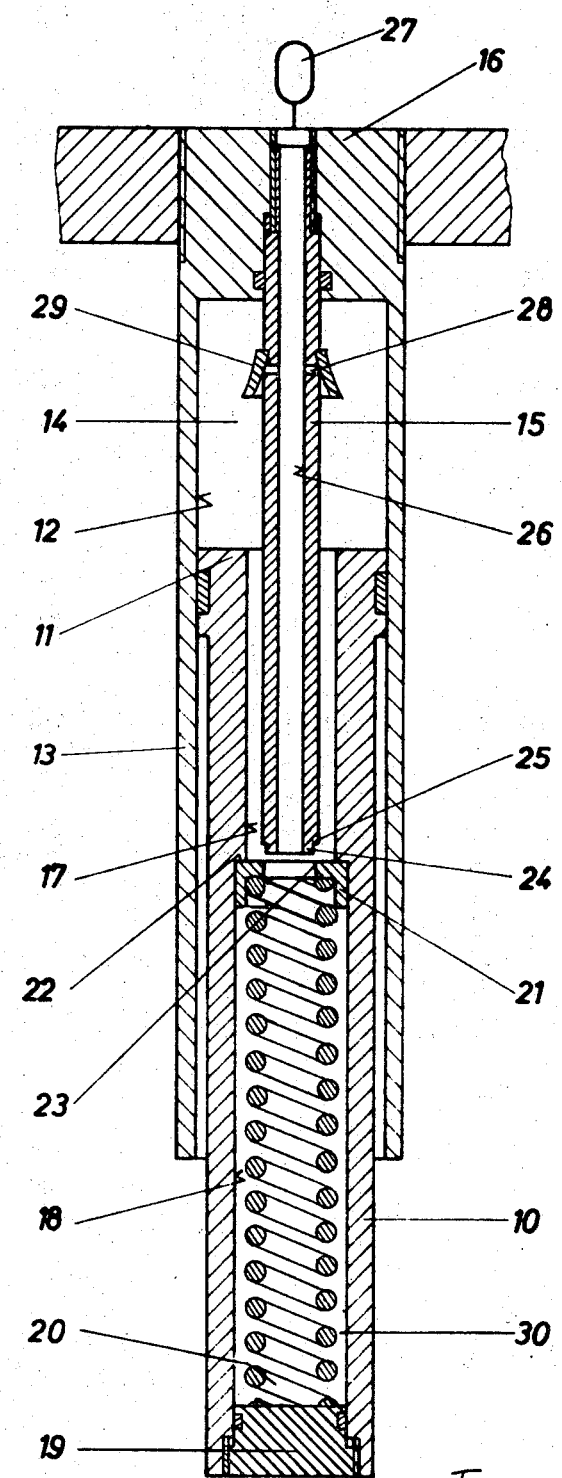
FIG. 3 is an axial sectional view of an embodiment of the invention.

Referring now to FIG. 3, it will be noted that a piston 11 having a piston rod 10 is slidably disposed in bore 12 of a cylinder 13. A rod 15 displaceably connected in a base 16 of the cylinder projects axially into pressure space 14 of the cylinder. The rod further extends into a bore 17 provided in the piston 11 and piston rod 10.

It will further be noted that the bore 17 merges with a bore 18 of larger cross section and the lower open end of the bore 18 is closed by an adjustable plug or closure 19. A piston 21 is mounted within the bore 18 and the piston 21 is held against a shoulder 22 by means of a helical spring 20 which has its respective ends bearing against the plug 19 and piston 21 respectively. Manifestly, the upper limit of the stroke of the piston 21 is determined by the shoulder 22.

It will further be noted that the head of the piston 21 is provided with a central orifice or opening 23 and into which orifice a reduced portion 24 of the rod 15 can project while a shoulder 25 surrounding the reduced portion 24 constitutes in conjunction with the piston 21 a valve seat. The rod 15 is provided with a bore 26 which extends throughout the length thereof and the upper end of the bore 26 is in communication with a hydropneumatic pressure reservoir or accumulator 27. It will also be noted that in proximity to the base 16, the rod 15 is provided with a transverse bore 28 which is surrounded by a cuff 29 functioning as a check valve.

The operation of the above-described assemblage is as follows:

Starting from the position illustrated in FIG. 3, the piston 11 moves in the cylinder 13 and liquid is displaced from the decreasing pressure space 14 into the reservoir 27 by means of the bores 17 and 26. The reduced portion 24 of the rod 15 moves closer to the orifice 23 of the piston 21 which of course is pressed against the shoulder 22 by the spring 20 under a certain initial tension. With the increasing approach, the remaining hiatus between the piston 21 and the rod 15 becomes smaller and the liquid which at first flows substantially without resistance is throttled more and more. This action results in a pressure increase in the pressure zone 14 relative to the spring zone or the bore 26 and the reservoir 27. As soon as the increase in force caused thereby and which acting on the top of the piston 21 exceeds the force of the spring 20, the piston 21 will move inwardly relative to the piston rod 10 and augment the tension of the spring 20 according to the stroke of the piston. As the force of the spring 20 increases in proportion to the line of travel, the resistance to flow increases in a corresponding manner.

Figure 2:
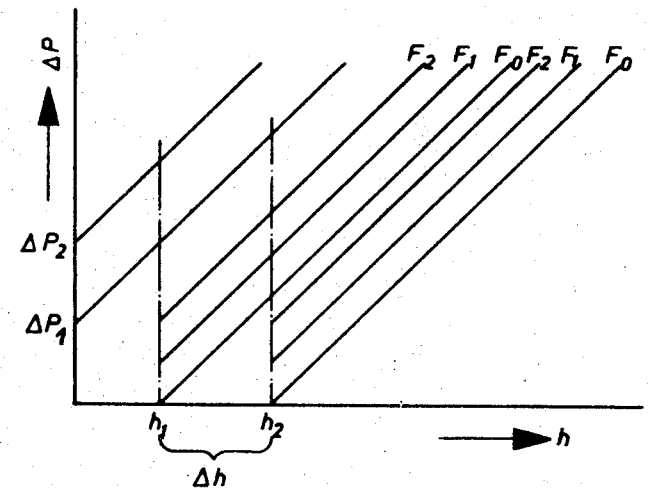
FIG. 2 is a diagrammatic view illustrating the variation of the pressure differences to be overcome at different settings as a function of the stroke.

As is depicted in FIG. 2, the different damping characteristics can be adjusted and this is achieved by means of the plug or closure 19. In other words, different initial tensions of the spring can be adjusted such as for instance, $F_2$ being greater than $F_1$ being greater than $F_0$. The greater the initial tension, the greater at equal strokes the necessary pressure difference $\Delta P$. Another possibility of adjustment results by a displacement of the rod 15 and with the rod 15 extending far into the pressure space 14 or the piston rod 10, the damping begins to become effective following a relatively small stroke $h_1$. If the rod is moved out by an amount $\Delta h$, the damping sets in only at $hP = h_1 + \Delta h$.

Manifestly, it is also possible by a suitable dimensioning of the individual components to damp directly starting from a zero position. The initial pressure gradient then corresponds for example, to $\Delta p1$ or $\Delta p2$. When, following a certain stroke, the piston 11 comes to rest, the shoulder 25 will be positioned on the head of the piston 21 and thus constitute a tight seat or seal. Upon extension the seat is initially maintained and according to the movement of the piston the resilient zone again increases and the liquid requirement is supplied from the reservoir 27. The pressure space 14 is in part filled with the liquid displaced by the piston 21 from the bore 18 and the lacking liquid passes from the reservoir 27 by way of the bore 26, the transverse bore 28 and cuff 29 into the pressure space 14.

It is of course to be appreciated that other examples of structural arrangement are possible within the scope of the invention. For example, the seat between the rod 15 and the piston 20 may be of other designs and flat or conical seats are feasible. To avoid any undesirable effects of viscosity, the orifice 23, may, for example, be conical thereby providing a sharp diaphragm type control edge. The rod 15 may be provided with a blind bore provided the reservoir 27 is connected in a different manner with the resilient area 30. Of course, the invention may be employed with plunger as well as piston rod cylinders and it is not necessary for the piston to be provided with a central orifice if it slides under the seal in the bore 18 and the resilient zone 30.

I claim:

1. A line of movement dependent damping assemblage for hydropneumatic oleo struts and the like, comprising a cylinder, a piston movable therein and cooperable with the cylinder to provide a pressure space, a pressure reservoir connected with the pressure space and having a damping characteristic variable as a function of the position of the piston relative to the cylinder, a spring loaded pressure limiting valve located between the pressure space and the pressure reservoir, and opening towards the pressure reservoir, a spring abutment, and the tension of the spring being varied by displacement of the spring abutment corresponding to the relative movement between the piston and the cylinder, a piston rod for said piston, said pressure limiting valve being located within the interior of the cylinder and defined by a rod extending axially into the pressure space and constituting a valve seat with a further piston sliding in a space provided in the piston rod and loaded by said spring biased between the abutment and the further piston said further piston having an axial orifice, with said pressure reservoir being connected with a zone encompassing said further piston and spring loading said further piston, and said rod extending axially into the pressure space being displaceably secured in a base of the cylinder.

2. A line of movement dependent damping assemblage for hydropneumatic oleo struts and the like, comprising a cylinder, a piston movable therein and cooperable with the cylinder to provide a pressure space, a pressure reservoir connected with the pressure space and having a damping characteristic variable as a function of the position of the piston relative to the cylinder, a spring loaded pressure limiting valve located between the pressure space and the pressure reservoir, and opening towards the pressure reservoir, a spring abutment, and the tension of the spring being varied by displacement of the spring abutment corresponding to the relative movement between the piston and the cylinder, a piston rod for said piston, said pressure limiting valve being located within the interior of the cylinder and defined by a rod extending axially into the pressure space and constituting a valve seat with a further piston sliding in a space provided in the piston rod and loaded by said spring biased between the abutment and the further piston, said further piston having an axial orifice, with said pressure reservoir being connected with a zone encompassing said further piston and spring loading said further piston, and a plug for the lower end of the piston rod constitutes the abutment for the spring loading said further piston and is displaceable relative to the piston rod.

3. The damping assemblage as claimed in claim 2 in which said piston stroke is limited by a shoulder provided in the piston rod.

4. The damping assemblage as claimed in claim 3 in which said spring is pretensioned whence said further piston bears against said shoulder.

5. The damping assemblage as claimed in claim 4 in which said rod extending axially into the pressure space is provided with a reduced end portion which fits into the orifice of said further piston.